(12) United States Patent
Vanicek

(10) Patent No.: US 7,308,994 B1
(45) Date of Patent: Dec. 18, 2007

(54) TURKEY CALL HOLSTER

(76) Inventor: Robert J. Vanicek, 8800 Francis Rd., Girard, PA (US) 16417

( * ) Notice: Subject to any disclaimer, the term of this patent is extended or adjusted under 35 U.S.C. 154(b) by 563 days.

(21) Appl. No.: 10/817,714

(22) Filed: Apr. 1, 2004

(51) Int. Cl.
*A45C 13/30* (2006.01)

(52) U.S. Cl. ............... 224/222; 446/397; 224/267; 206/315.11

(58) Field of Classification Search ............ 224/222, 224/191, 251, 267, 219, 221, 915, 914; 206/315.11; 446/397; 84/421, 412, 420
See application file for complete search history.

(56) References Cited

U.S. PATENT DOCUMENTS

| | | | | |
|---|---|---|---|---|
| 1,113,253 A | * | 10/1914 | Schreiner | 84/412 |
| 1,955,436 A | * | 4/1934 | Mott | 34/95 |
| 3,920,207 A | * | 11/1975 | Adamaitis | 248/538 |
| 5,563,574 A | * | 10/1996 | Hoover | 340/384.7 |
| 5,802,197 A | * | 9/1998 | Fulcher | 381/386 |
| 6,370,807 B1 | * | 4/2002 | Eisenhut et al. | 42/90 |
| D501,420 S | * | 2/2005 | Lindler | D10/119 |
| 6,872,118 B1 | * | 3/2005 | Bishop | 446/397 |
| 6,902,463 B2 | * | 6/2005 | Vaicunas et al. | 446/397 |

* cited by examiner

*Primary Examiner*—Nathan J. Newhouse
*Assistant Examiner*—Jack Morgan
(74) *Attorney, Agent, or Firm*—Richard R Thomson

(57) ABSTRACT

A holster secures a turkey call to a hunter's leg or arm freeing up one hand for supporting her/his shotgun or bow. A series of serrations on an external face of an annular retainer ring engage serrations on an internal surface of a cylindrical upper portion of the holster to retain the retainer ring and the encircled turkey call engaged with the holster. A reverberation chamber in the lower portion of the holster has an angled reflecting surface to bounce the sound vibrations emanating from the turkey call out an opening in the opposing side wall.

15 Claims, 6 Drawing Sheets

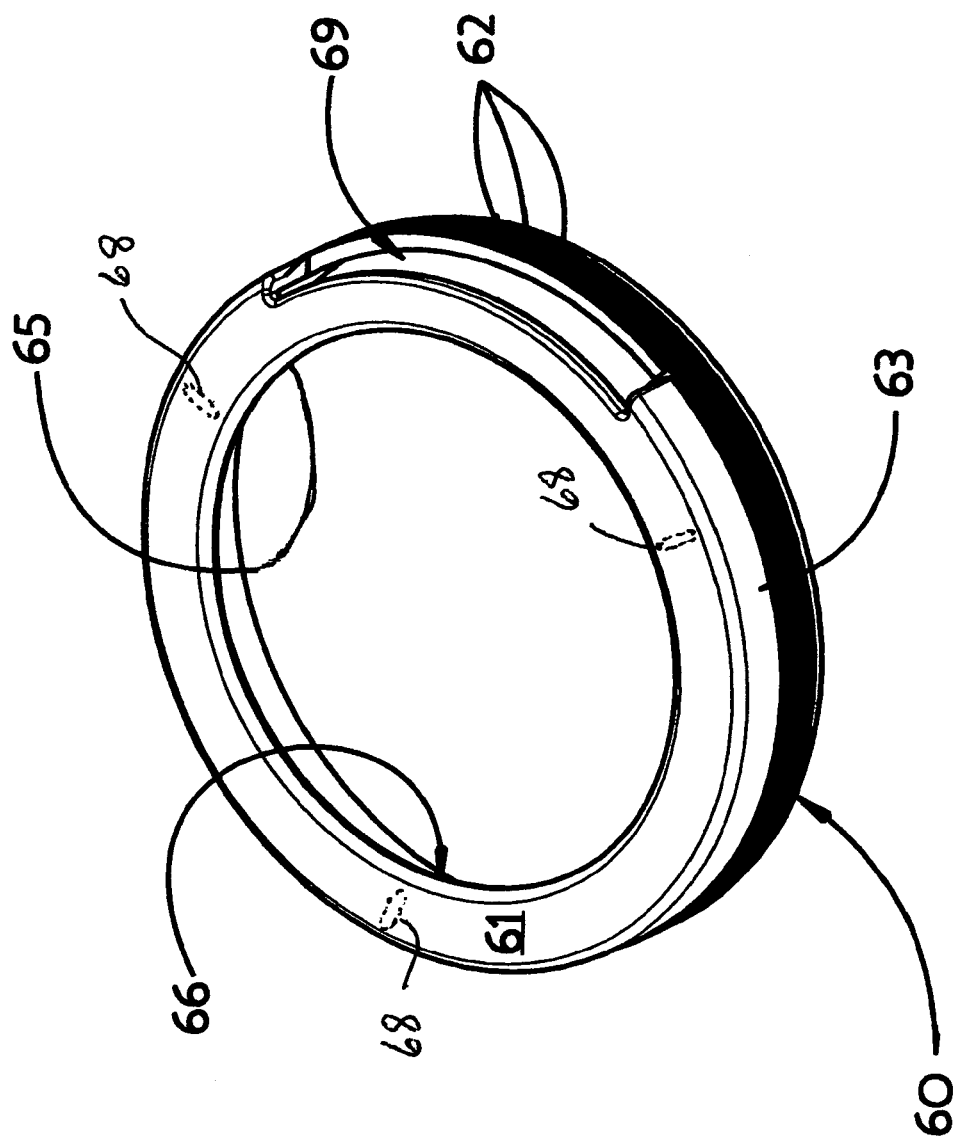

TURKEY CALL HOLSTER

BACKGROUND AND SUMMARY OF THE INVENTION

The present invention is directed to the field of hunting. More particularly, the present invention is directed to a turkey call holder configured as a holster with a retention grommet for the striker and a reverberation chamber for amplifying and reflecting the sound produced by the call.

There are numerous call devices currently on the market. Many are of the whistle variety. Not everyone has had much success with this type of turkey call and, hence, there are several striker-activated calls on the market. The present invention provides an improved striker-activated turkey call holder in the form of a holster-shaped member with a cylindrical top portion for receiving the turkey call, a first side angled inwardly from said cylindrical top portion to a bottom wall, an opposing side having a first sound emitting opening, whereby when the turkey call emits sound vibrations, the sound vibrations resonate within the holster-shaped chamber, bounce off said first side and out of said sound emitting opening. The turkey call holder of the present invention has a protrusion extending laterally outwardly from the cylindrical top portion, the protrusion having a grommet for securely receiving and retaining a striker for the turkey call.

The holder of has a retention means which engages said cylindrical top portion to retain the turkey call in said holster shaped member. Preferably, the retention means is an annular ring with a large opening in its tops face through which the striker can be utilized to activate the call. The interior of the cylindrical top of the holster has a first series of serrations which engage a second series on the external periphery of the annular ring to maintain the retention means engaged with the holster. A first plurality of openings is formed in said first side wall and a second plurality of openings formed in said bottom to permit a strap to be woven through the first and second plurality of openings for securing said turkey call holder to a user's leg or arm. A first plurality of isolation mounts is positioned within the circular top portion for supporting the turkey call and a second plurality of isolation mounts is positioned on an under surface of said annular ring for contacting an upper face of the turkey call in a manner to facilitate its vibration.

Various other features, advantages and characteristics of the present invention will become apparent to one of ordinary skill in the art after a reading of the following specification.

BRIEF DESCRIPTION OF THE DRAWINGS

The preferred embodiment(s) of the present invention is/are described in conjunction with the associated drawings in which like features are indicated with like reference numerals and in which

FIG. 6 is a perspective view of the retention means used with the first embodiment.

DETAILED DESCRIPTION OF PREFERRED EMBODIMENT(S)

Figure 1:
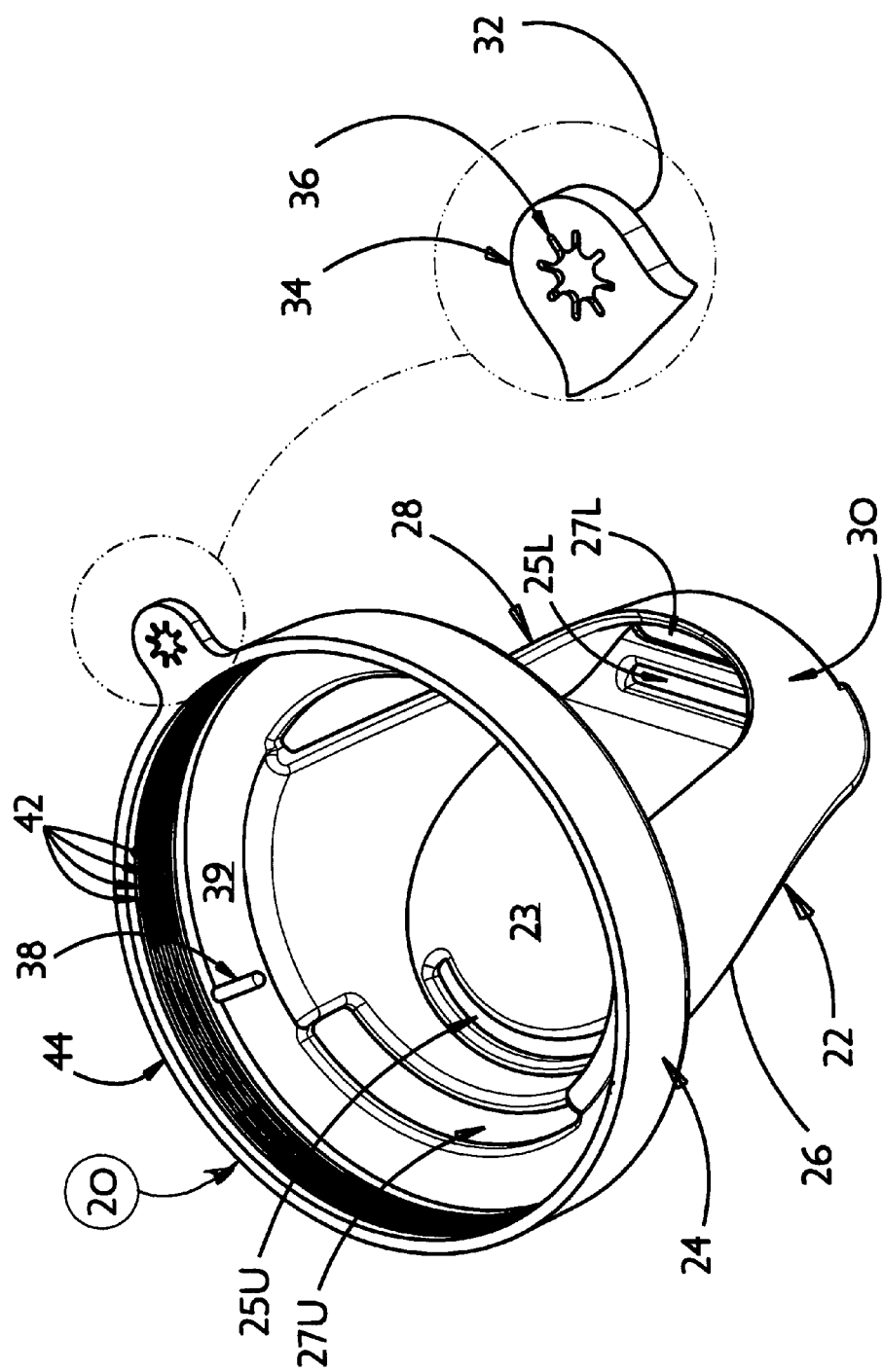
FIG. 1 is a perspective view of a first embodiment of the holster of the turkey call holder of the present invention.
Figure 2:
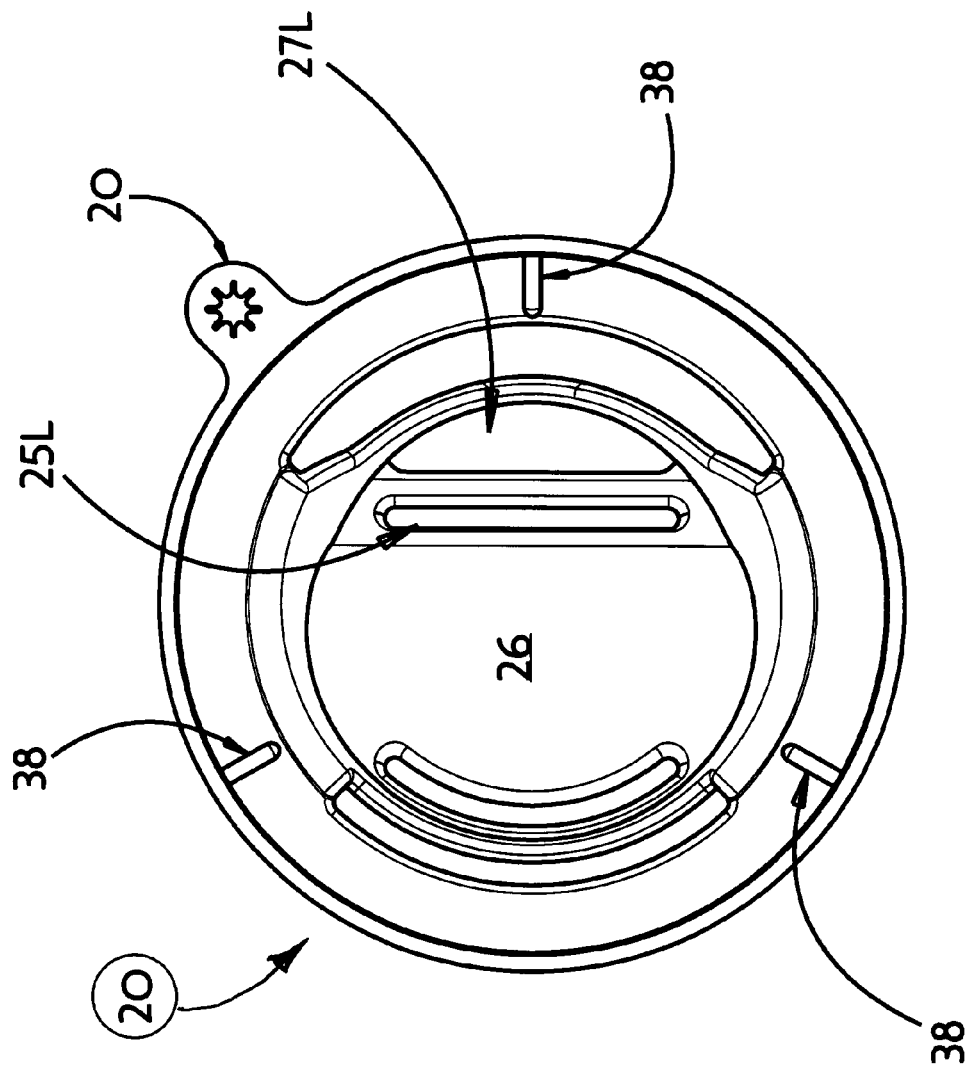
FIG. 2 is a top view of the first embodiment.
Figure 3:
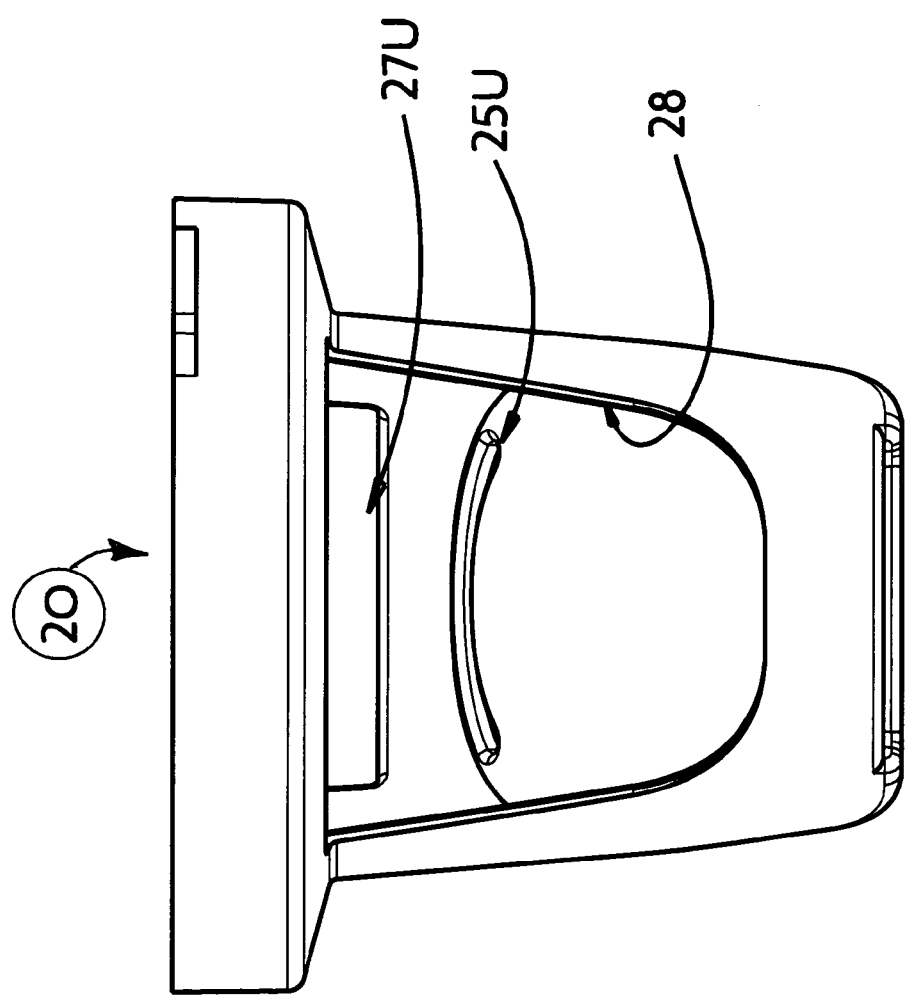
FIG. 3 is a front view of the first embodiment.
Figure 4:
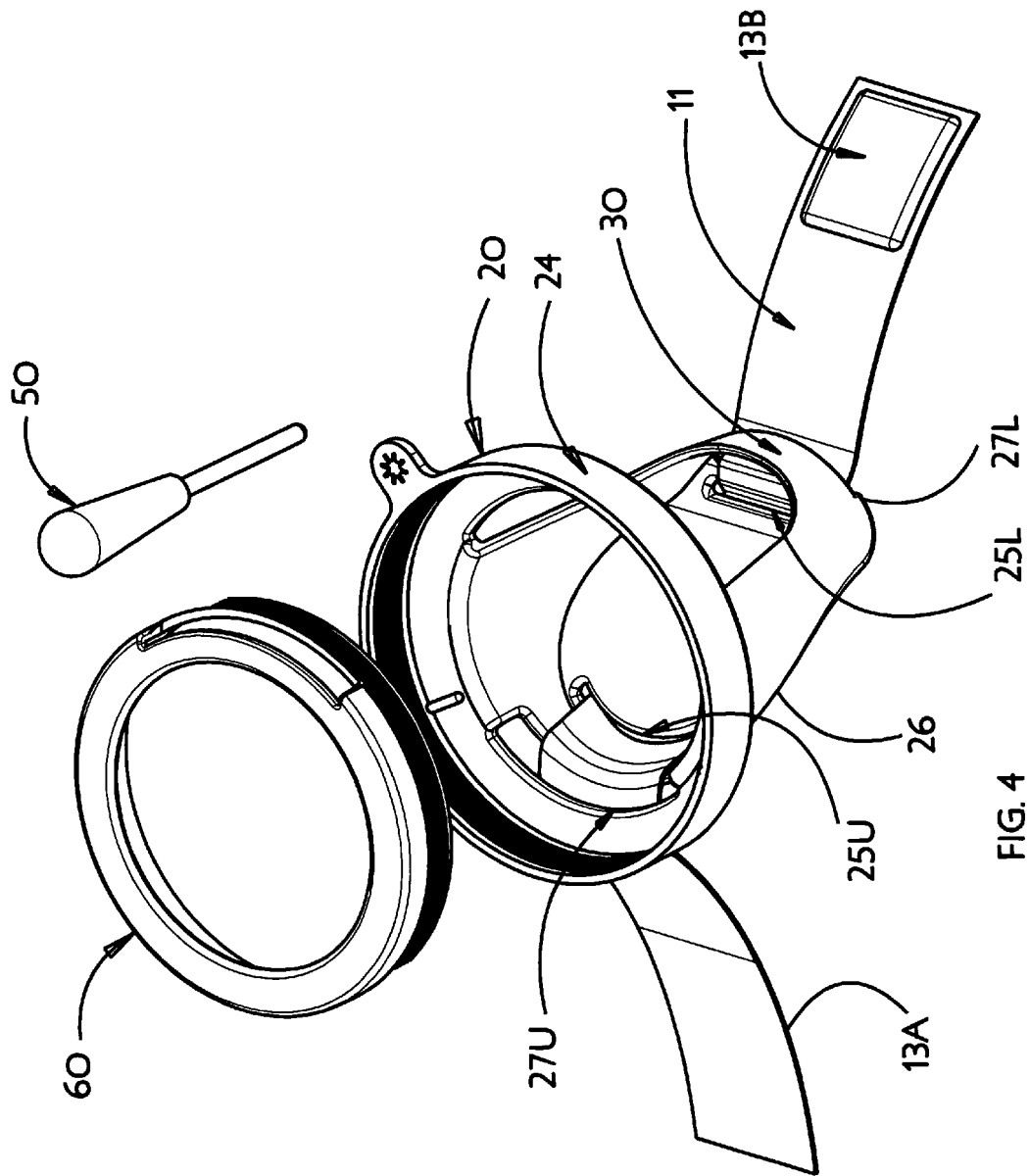
FIG. 4 is an exploded perspective view of the first embodiment.
Figure 5:
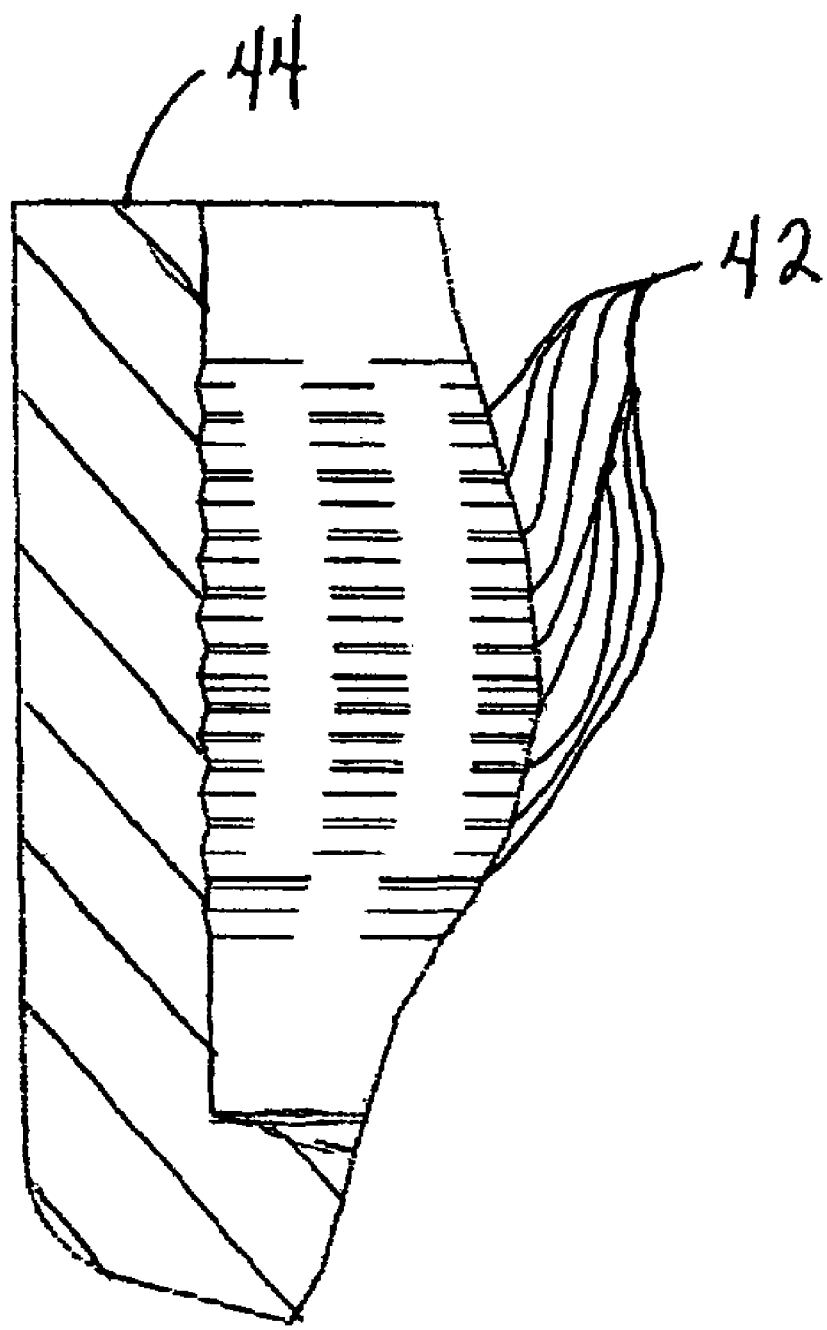
FIG. 5 is a detailed cross-sectional side view.

A first preferred embodiment of the present invention is depicted in FIGS. 1-4 generally at 20. Turkey call holster 20 has a tapering body portion 22 with a cylindrical top portion 24. Body portion 22 forms a resonation chamber 23 and has a first side wall 26 angled inwardly to deflect sound generated by a turkey call placed in holster 20 out opening 28 formed in opposite wall 30. Grommet 32 is formed on protrusion 34 for receiving a striker 50. Preferably, grommet 32 has integral flexible fingers 36 molded into the protrusion. More preferably, first side wall 26 has a radius to facilitate its engagement with a user's leg or arm. The side wall 26 is adapted to sit atop of the hunter's thigh and be secured there by a strap 11 (FIG. 4) which is threaded through slots 25U and 25L and out openings 27U and 27L.

Strap 11 has Velcro fabric 13a and 13b on each end to enable the user to wrap the strap 11 around her/his leg or arm and attach the Velcro fabric to position the turkey call holder 20 where a striker 50 (FIG. 4) can be removed from grommet 32 and used to generate a vibration which resonates within chamber 23, bounces offside wall 26 and is deflected out opening 28 in opposing wall 30. A first plurality (as depicted herein, three) isolation mounts 38 extend upwardly from upwardly directed surface 39 of cylindrical top portion 24. These isolation mounts 38 support the slate turkey call (not shown) in a manner to facilitate its vibration when activated by striker 50. A first plurality of serrations 42 are formed on the inner periphery of upstanding wall 44 of the cylindrical top portion 24.

Retention means in the form of an annular ring 60 (FIG. 6) secures the turkey call within holster 20. Annular ring 60 has an upper face 61 and a downwardly extending side wall 63. Upper face 61 has a large opening 65 which affords access to substantially the entire upper surface of the slate turkey call by striker 50. A second plurality of isolation mounts 68 are formed on the lower surface of horizontal wall 66 to engage the turkey call and secure it within the holster 20 so that it does not rattle or make any other noise which could startle the prey. Again, isolation mounts 68 facilitate the vibration of the turkey call without permitting it to move within the holster 20.

It is preferred that the holster and the annular retention ring 60 be made of glass-filled polypropylene. It is envisioned that 10% by weight glass will be a preferable blend. A second series of serrations 62 are formed on the external periphery of side wall 63 to enable it to be pressed into cylindrical top portion 24, second series of serrations 62 engaging first series of serrations 42 and retaining annular ring 60 and the encircled turkey call within cylindrical top portion 24. At least one model of turkey call has a laterally extending flange from one quadrant thereof. An opening 69 is formed in upper face 61 and side wall 63 to accommodate the flange.

The turkey call holster 20 of the present invention permits a hunter to strap the holster 20 containing the turkey call as secured by retention means 60 to her/his leg or arm. Striker 50 can be used to activate the sound of the turkey call by rubbing it over the surface of the slate. This can be performed with one hand while the other supports the hunter's weapon, typically a shotgun or bow. The vibration of the call will resonate within the body 22 of the holster 20, be reflected by side wall 26 out of opening 28 in opposing wall 30. It is expected that the sound emanating from the holster 20 will be thrown outwardly sufficiently far that the turkey will not easily identify the source and, hence, will circle the hunter at a suitable radius to enable the hunter to bag her/his quarry. The striker 50 can be returned to the grommet 32 and a shot taken, all with minimal motion which could frighten the bird(s). The invention disclosed herein is available for purchase as the BSS Turkey Call Holster.

Various changes, alternatives and modifications will become apparent to one of ordinary skill in the art following a reading of the foregoing specification. It is intended that any such changes, alternatives and modifications as fall within the scope of the appended claims be considered part of the present invention.

I claim:

1. A turkey call holder comprising a holster-shaped member with a cylindrical opening in a top portion for receiving a turkey call, a first side wall angled inwardly from said cylindrical top portion to a bottom wall, said first side wall underlying a majority of said opening in said top portion, an opposing side wall having a first sound emitting opening, further comprising a first plurality of openings formed in said first side wall and a second plurality of openings formed in said bottom, whereby when the turkey call emits sound vibrations, the sound vibrations resonate within the holster-shaped chamber, bounce off said first side wall and out of said sound emitting opening.

2. The turkey call holder of claim 1 further comprising a retention means which engages an upstanding wall of said cylindrical top portion to retain the turkey call in said holster shaped member.

3. The turkey call holder of claim 2 further comprising a first series of serrations formed on an internal periphery said upstanding wall of said cylindrical top portion.

4. The turkey call holder of claim 3 wherein said retention means further comprises an annular ring having a top face with a large opening therein and a downwardly extending side wall, said retention means having a second series of serrations formed on an outer periphery of said sidewall which engage said first series of serrations on said upstanding wall of said cylindrical top portion to maintain said retention means engaged with said holster shaped member.

5. The turkey call holder of claim 4 further comprising a first plurality of isolation mounts positioned within said circular top portion for supporting the turkey call to facilitate its vibration.

6. The turkey call holder of claim 5 further comprising a second plurality of isolation mounts positioned on an under surface of said annular ring for contacting an upper face of the turkey call in a manner to facilitate its vibration.

7. The turkey call holder of claim 4 further comprising an opening in said sidewall of said retention means to accommodate a protruding portion of the turkey call.

8. The turkey call holder of claim 1 further comprising a protrusion extending laterally outwardly from said cylindrical top portion, said protrusion having a grommet for securely receiving and retaining a striker for the turkey call.

9. The turkey call holder of claim 1 further comprising a strap woven through said first and second plurality of openings for securing said turkey call holder to a user's leg or arm.

10. A turkey call holder comprising a holster-shaped member with a cylindrical top portion for receiving a turkey call, a first side wall angled inwardly from said cylindrical top portion to a bottom wall, an opposing side wall having a first sound emitting opening, a retention means which engages an upstanding wall of said cylindrical top portion to retain the turkey call in said holster shaped member, a first series of serrations formed on an internal periphery said upstanding wall of said cylindrical top portion, an annular ring having a top face with a large opening therein and a downwardly extending side wall;

whereby when the turkey call emits sound vibrations, the sound vibrations resonate within the holster-shaped chamber, bounce off said first side wall and out of said sound emitting opening.

11. The turkey call holder of claim 10 wherein said retention means further comprises an annular ring having a top face with a large opening therein and a downwardly extending side wall, said retention means having a second series of serrations formed on an outer periphery of said sidewall which engage said first series of serrations on said upstanding wall of said cylindrical top portion to maintain said retention means engaged with said holster shaped member.

12. The turkey call holder of claim 11 further comprising a first plurality of isolation mounts positioned within said circular top portion for supporting the turkey call to facilitate its vibration.

13. The turkey call holder of claim 12 further comprising a second plurality of isolation mounts positioned on an under surface of said annular ring for contacting an upper face of the turkey call in a manner to facilitate its vibration.

14. The turkey call holder of claim 11 further comprising an opening in said sidewall of said retention means to accommodate a protruding portion of the turkey call.

15. A turkey call holder comprising a holster-shaped member with a cylindrical top portion for receiving a turkey call, a first side wall angled inwardly from said cylindrical top portion to a bottom wall, an opposing side wall having a first sound emitting opening, a first plurality of isolation mounts positioned within said circular top portion for supporting the turkey call to facilitate its vibration, whereby when the turkey call emits sound vibrations, the sound vibrations resonate within the holster-shaped chamber, bounce off said first side wall and out of said sound emitting opening.

* * * * *